(12) United States Patent
Malsam et al.

(10) Patent No.: US 12,447,984 B2
(45) Date of Patent: Oct. 21, 2025

(54) "BY-WIRE" OPERATING SYSTEM OF A MOTOR VEHICLE AND METHOD FOR OPERATING SUCH AN OPERATING SYSTEM

(71) Applicants: thyssenkrupp Presta AG, Eschen (LI); thyssenkrupp AG, Essen (DE)

(72) Inventors: Robin Malsam, Feldkirch (AT); Andras Csaba, Budapest (HU); Leonard Lapis, Sennwald (CH); Kristof Polmans, Tarrenz (AT)

(73) Assignees: thyssenkrupp Presta AG, Eschen (LI); thyssenkrupp AG, Essen (DE)

( * ) Notice: Subject to any disclaimer, the term of this patent is extended or adjusted under 35 U.S.C. 154(b) by 153 days.

(21) Appl. No.: 18/221,341

(22) Filed: Jul. 12, 2023

(65) Prior Publication Data

US 2024/0017734 A1    Jan. 18, 2024

(30) Foreign Application Priority Data

Jul. 13, 2022   (BE) .................................. 2022/5572

(51) Int. Cl.
*B60W 50/10*   (2012.01)
*B60W 10/04*   (2006.01)
(Continued)

(52) U.S. Cl.
CPC ............ *B60W 50/10* (2013.01); *B60W 10/04* (2013.01); *B60W 10/18* (2013.01); *B60W 10/20* (2013.01); *B60W 50/16* (2013.01)

(58) Field of Classification Search
CPC ...... B60W 50/10; B60W 10/04; B60W 10/18; B60W 10/20; B60W 50/16; B60W 10/184;
(Continued)

(56) References Cited

U.S. PATENT DOCUMENTS 10,773,749 B2 * 9/2020 Skellenger ........... B62D 5/0484
11,273,863 B2 * 3/2022 Wesenberg .......... B62D 5/0484
(Continued)

FOREIGN PATENT DOCUMENTS

DE    100 19 152 A1    12/2000
DE    103 60 582 A1    7/2004
(Continued)

*Primary Examiner* — Sizo B Vilakazi
(74) *Attorney, Agent, or Firm* — thyssenkrupp North America, LLC

(57) ABSTRACT

The present disclosure relates to a method for operating an operating system (1.1, 1.2, 1.3) of a motor vehicle, in which a control command (M1) for controlling the motor vehicle is specified via a control element (3.1, 3.2, 3.3), the control command (M1) specified via the control element (3.1, 3.2, 3.3) is sensorially acquired and passed on from an electronic control unit (4) to an electromechanical actuator unit (5.1, 5.2, 5.3) as a control signal, wherein the actuator unit (5.1, 5.2, 5.3) implements the control command (M1) according to the control signal. The operating system (1.1, 1.2, 1.3) is monitored here for an occurrence of a deviation from a target behaviour of the actuator unit (5.1, 5.2, 5.3), wherein tactile feedback is applied to the control element (3.1, 3.2, 3.3) if a deviation is detected.

17 Claims, 2 Drawing Sheets

(51) Int. Cl.
*B60W 10/18* (2012.01)
*B60W 10/20* (2006.01)
*B60W 50/16* (2020.01)

(58) Field of Classification Search
CPC ............ B60W 50/04; B60W 2540/10; B60W 2540/12; B60W 2540/18; B60W 50/14; B62D 5/0481; B62D 5/001; B62D 5/0484; B62D 6/008; B62D 5/006
See application file for complete search history.

(56) References Cited

U.S. PATENT DOCUMENTS

| | | |
|---|---|---|
| 2010/0305803 A1 | 12/2010 | Schusteritz |
| 2014/0343697 A1* | 11/2014 | Kuipers ............... B60W 50/16 700/83 |
| 2017/0144698 A1* | 5/2017 | Bourdrez ............. G07C 5/0808 |
| 2019/0111969 A1* | 4/2019 | Pramod ............... B62D 5/005 |
| 2019/0210639 A1* | 7/2019 | Wang ................... B62D 5/0424 |
| 2019/0389508 A1* | 12/2019 | Varunjikar ........... B62D 5/0481 |
| 2022/0119033 A1* | 4/2022 | Minninger ............. B62D 6/00 |
| 2023/0017618 A1* | 1/2023 | Albrecht ............... B62D 6/008 |

FOREIGN PATENT DOCUMENTS

| | | |
|---|---|---|
| DE | 10 2008 026729 A1 | 12/2009 |
| DE | 10 2009 026497 A1 | 12/2010 |
| DE | 10 2013 016040 A1 | 4/2014 |
| DE | 10 2014 001 998 A1 | 6/2015 |
| DE | 10 2018 125667 A1 | 4/2019 |
| DE | 10 2018 100515 A1 | 7/2019 |
| DE | 10 2019 135047 A1 | 6/2021 |
| DE | 10 2020 205 904 A1 | 11/2021 |
| WO | 2021/032839 A1 | 2/2021 |

* cited by examiner

"BY-WIRE" OPERATING SYSTEM OF A MOTOR VEHICLE AND METHOD FOR OPERATING SUCH AN OPERATING SYSTEM

CROSS REFERENCE TO RELATED APPLICATION

This application is a U.S. Non-Provisional that claims priority to Belgian Patent Application No. BE 2022/5572, filed Jul. 13, 2022, the entire content of which is incorporated herein by reference.

FIELD

The disclosure generally relates to an operating an operating system of a motor vehicle and method of use.

BACKGROUND

Furthermore, the disclosure relates to an operating system of a motor vehicle, which comprises a control element, a sensor unit, a control unit, an electromechanical actuator unit, and a feedback actuator, wherein the control element is designed upon actuation to specify a control command for controlling a motor vehicle as control information, the sensor unit is designed to acquire the control information specified by the control unit, the control unit is designed to provide a control signal for activating an electromechanical actuator unit based on the acquired control information for implementing the control command, the electromechanical actuator unit is designed to implement the control command in accordance with the provided control signal, and the feedback actuator is designed to apply tactile feedback to the control signal.

A steer-by-wire steering system as an operating system of a motor vehicle is known, for example, from DE 10 2020 205 904 A1 in the prior art. Brake-by-wire systems and electronic power control systems, which are also known under the term "electronic gas pedal", are also known in the prior art. Such "drive-by-wire" operating systems have the disadvantage that a quality loss of the actuator unit, for example, due to aging and wear, can negatively influence the control of the motor vehicle, but is regularly not perceived by a vehicle user due to the mechanical decoupling of control element and actuator unit.

Thus, a need exists to improve a method mentioned at the outset for operating a motor vehicle and an operating system of a motor vehicle mentioned at the outset, in particular in such a way that a vehicle user perceives a change in the operating behaviour of the actuator unit in an improved manner.

BRIEF DESCRIPTION OF THE FIGURES

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION

Figure 1:
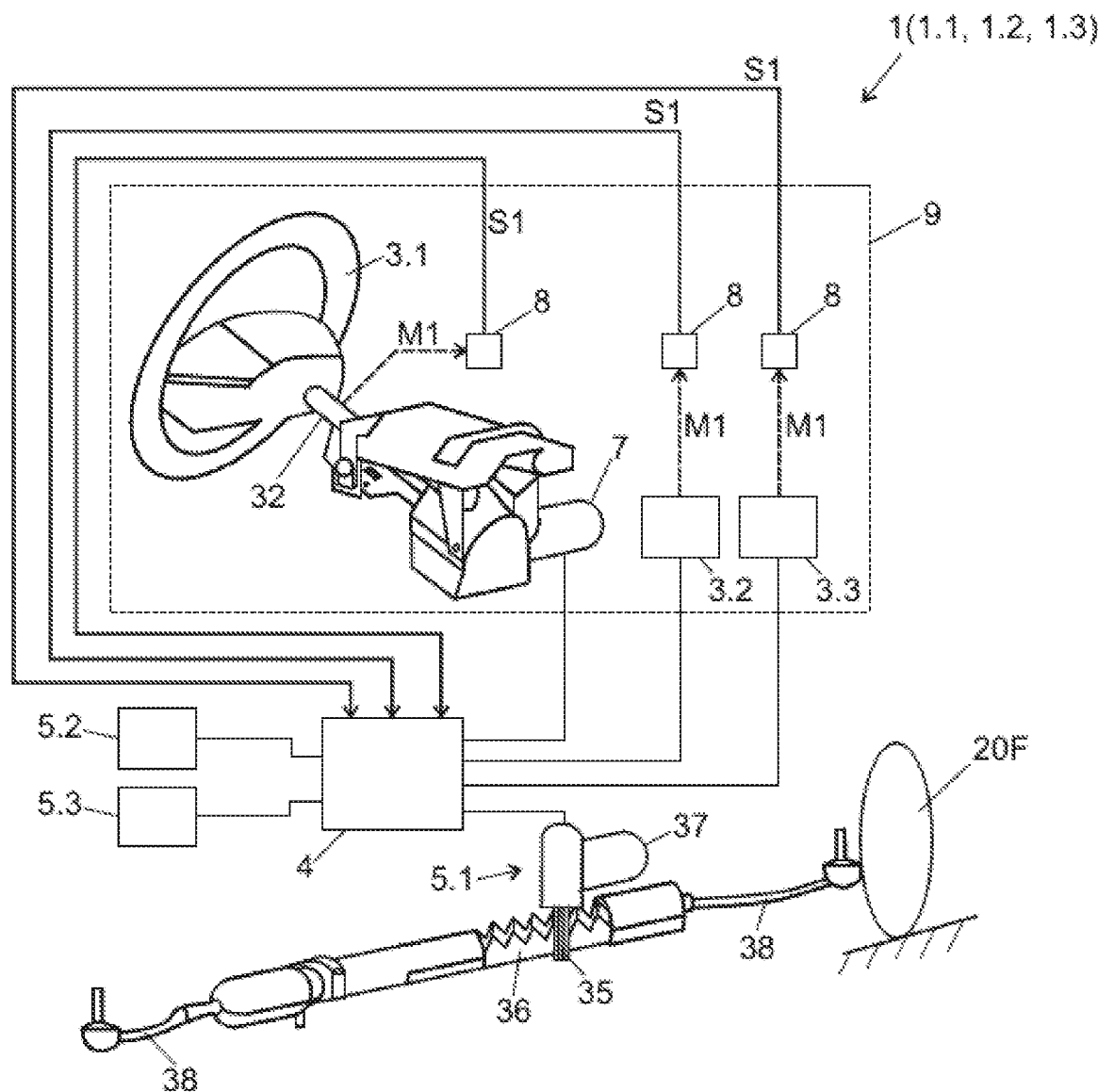
FIG. 1 shows a partially perspective and partially schematic illustration of an embodiment of operating systems of a motor vehicle designed according to the disclosure.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The disclosure relates to a method for operating an operating system of a motor vehicle, in particular a brake-by-wire system, an electronic power control system, or a steer-by-wire steering system, in which a control command for controlling the motor vehicle is specified via a control element, the control command specified via the control element is sensorially acquired and passed on from an electronic control unit to an electromechanical actuator unit as a control signal, wherein the actuator unit implements the control command in accordance with the control signal.

The proposed solution provides a method for operating an operating system of a motor vehicle, in which a control command for controlling the motor vehicle is specified via a control element. The control command specified via the control element is sensorially acquired, in particular exclusively sensorially acquired, and passed on from an electronic control unit, in particular an ECU (ECU: electronic control unit), to an electromechanical actuator unit as a control signal, wherein the actuator unit implements the control command in accordance with the control signal. The operating system is monitored here for an occurrence of a deviation from a target behaviour of the actuator unit, and tactile feedback is applied to the control element if a deviation is detected. In particular, it is provided that a correspondingly activated feedback actuator applies the tactile feedback to the control element. A vehicle user can advantageously perceive a change in the operating behaviour of the actuator unit, which deviates from a target behaviour, due to the tactile feedback applied to the control element.

The response behaviour of the control element is advantageously changed upon a detected deviation of the actuator unit from a target behaviour in relation to a normal operation, in which the actuator unit follows a target behaviour, in particular in that control signals for a feedback actuator which triggers the tactile feedback are changed in relation to a normal operation by at least 10%, furthermore are changed in particular in a range between 10% and 100%, so that preferably a correspondingly changed response behaviour of the control element is induced upon the operation of the control element. The perceptibility of an occurrence of a deviation from a target behaviour of the actuator unit by the vehicle user is advantageously further improved by these measures individually or in combination.

According to one advantageous embodiment, the operating system is monitored by a diagnostic unit for an occurrence of a deviation from a target behaviour of the actuator unit. The diagnostic unit can be comprised here in particular by the control unit.

One advantageous refinement of the method provides that a quality drop of the actuator unit is monitored as a deviation from the target behaviour. Such a quality drop can in particular be attributed to wear and/or material aging of the actuator unit. In particular, a quality drop can have the result that the actuator unit operates more sluggishly and/or play of the actuator unit is increased and/or dropouts occur in operation of the actuator unit. A vehicle user can advantageously perceive the quality drop due to the tactile feedback on the control element. Without the tactile feedback, the driving behaviour of the motor vehicle would otherwise be changed from the target behaviour due to the deviation of the behaviour of the actuator unit, wherein the behaviour of the control element would remain unchanged.

Furthermore, a feedback signal is advantageously generated in the event of a detected deviation from the target behaviour, wherein the tactile feedback is generated based on the feedback signal. The type of the tactile feedback is advantageously adapted to the type of the deviation from the target behaviour, in particular such that an identical deviation from a target behaviour of the actuator unit results in identical tactile feedback. A vehicle user can advantageously better classify a behaviour deviating from a target behaviour by this embodiment. In particular, it is provided that specified deviations from a target behaviour of the actuator unit are assigned specified movement patterns, which are advantageously applied as tactile feedback to the control element. If the actuator unit operates more sluggishly than a target operating behaviour provides, for example, it is provided in particular that a resistance torque elevated in comparison to normal operation is applied to the control element. Or, for example, if play of the actuator unit has increased in relation to a specified target behaviour, it is thus provided in particular that a resistance torque applied to the control element is reduced in comparison to normal operation and/or a resistance torque is applied to the control element with a delay in comparison to normal operation.

A further advantageous embodiment of the method provides that a degree of a deviation from the target behaviour is acquired. The feedback signal is advantageously generated in dependence on the acquired degree of the target value deviation. The intensity of the feedback signal advantageously increases here as a function of the detected deviation from the target behaviour, in particular proportionally in relation thereto, wherein the tactile feedback applied to the control element thus advantageously also increases in accordance with an increase of a deviation. If the actuator unit operates, for example, 10% more sluggishly than a target operating behaviour provides, it is provided in particular that a resistance torque increased by 10% in comparison to normal operation is applied to the control element. In contrast, if the actuator unit operates, for example, 20% more sluggishly than a target operating behaviour provides, it is provided in particular that a resistance torque increased by 20% in comparison to normal operation is applied to the control element.

In particular, it is provided that the tactile feedback is generated more intensely the higher the acquired degree of the deviation from the target behaviour is. The intensity of the tactile feedback can in particular also be generated disproportionately to the acquired degree of the deviation from the target behaviour, in particular to improve still further the perceptibility of the deviation of the behaviour of the actuator unit from the target behaviour. In particular, it can be provided that when the actuator unit operates 10% more sluggishly, for example, than a target operating behaviour provides, a resistance torque increased by 25% in comparison to normal operation is applied to the control element.

One advantageous embodiment variant of the method provides that the operating system is a brake-by-wire system having a brake pedal as a control element and a brake actuator unit as an electromechanical actuator unit. If a deviation of the target behaviour of the brake actuator unit is acquired, in this embodiment tactile feedback is thus applied to the brake pedal.

A further advantageous embodiment variant provides that the operating system is an electronic power control system having a gas pedal as a control element and a drive actuator unit as an electromechanical actuator unit. The expression "gas pedal" is used here in its general meaning and insofar applies in particular to all vehicle drives, in particular both to vehicles having internal combustion engines and also to vehicles having electric motors. If a deviation of the target behaviour of the drive actuator unit is acquired, tactile feedback is thus applied to the gas pedal in this embodiment.

A further advantageous embodiment variant of the method provides that the operating system is a steer-by-wire steering system having a steering handle, in particular a steering wheel, as a control element and a steering actuator as an electromechanical actuator unit. If a deviation of the target behaviour of the steering actuator is acquired, in this embodiment tactile feedback is advantageously applied to the steering handle, in particular by means of a feedback actuator of the steering system.

The operating system of a motor vehicle furthermore proposed to achieve the above-mentioned object comprises a control element, a sensor unit, an electromechanical actuator unit, and a feedback actuator. The control element is advantageously designed here to specify a control command for controlling a motor vehicle as control information upon actuation. The sensor unit is advantageously designed to acquire the control information specified by the control element. The control unit is advantageously designed to provide a control signal for activating the electromechanical actuator unit based on the acquired control information for implementing the control command. The electromechanical actuator unit is advantageously designed to implement the control command in accordance with the provided control signal. The feedback actuator is advantageously designed to apply tactile feedback to the control element. According to the disclosure, the operating system is designed to be operated according to a method designed according to the disclosure, wherein the method in particular comprises the above-described features individually or in any combination. In particular, the operating system of a motor vehicle is thus designed to be operated in such a way that a control command for controlling the motor vehicle is specified via a control element, the control command specified via the control element is sensorially acquired and passed on from an electronic control unit to an electromechanical actuator unit as a control signal, wherein the actuator unit implements the control command in accordance with the control signal, the operating system is monitored for an occurrence of a deviation from a target behaviour of the actuator unit, and if a deviation is detected, tactile feedback is applied to the control element. The proposed operating system therefore advantageously enables a vehicle user to perceive a change in the operating behaviour of the actuator unit, which is no longer within a target behaviour, due to the tactile feedback applied to the control element.

According to one preferred embodiment, the operating system is a drive-by-wire system, thus in particular an operating system which enables driving of a motor vehicle without mechanical force transmission of the operating elements to the corresponding positioning elements. In particular, it is provided that the operating system is a brake-by-wire system having a brake pedal as a control element and a brake actuator unit as an electromechanical actuator unit. Furthermore, it is provided in particular that the operating system is an electronic power control system having a gas pedal as a control element and a drive actuator unit as an electromechanical actuator unit. It is provided as a further particularly advantageous embodiment that the operating system is a steer-by-wire steering system having a steering handle as a control element and a steering actuator as an electromechanical actuator unit. In this embodiment, it is provided in particular that the control element is a steering handle arranged in a rotationally-fixed manner on a steering shaft, using which a steering command can be specified as a control command. Furthermore, it is provided in particular that the operating system comprises a steering gear in this embodiment, which includes a steering actuator as an actuator unit and a coupling element, wherein to convert a steering command into a steering movement of steerable wheels of a motor vehicle, a control signal is sent to the drive unit of the steering actuator and the drive unit converts the received control signal into a mechanical movement of the steering actuator in that the steering actuator acts on the coupling element. In addition, the steer-by-wire steering system advantageously comprises a feedback actuator, which conveys a steering feeling to a vehicle user during control in normal operation and supplies feedback, in particular with respect to a wheel-roadway contact. In addition, the feedback actuator is advantageously designed in this embodiment to apply tactile feedback to the steering handle in addition thereto when a deviation of the steering actuator from a target behaviour has been acquired.

In particular, the disclosure also proposes a motor vehicle having an operating system designed according to the disclosure.

In the various figures, identical parts are generally provided with identical reference signs and are therefore sometimes each only explained in conjunction with one of the figures.

Figure 2:
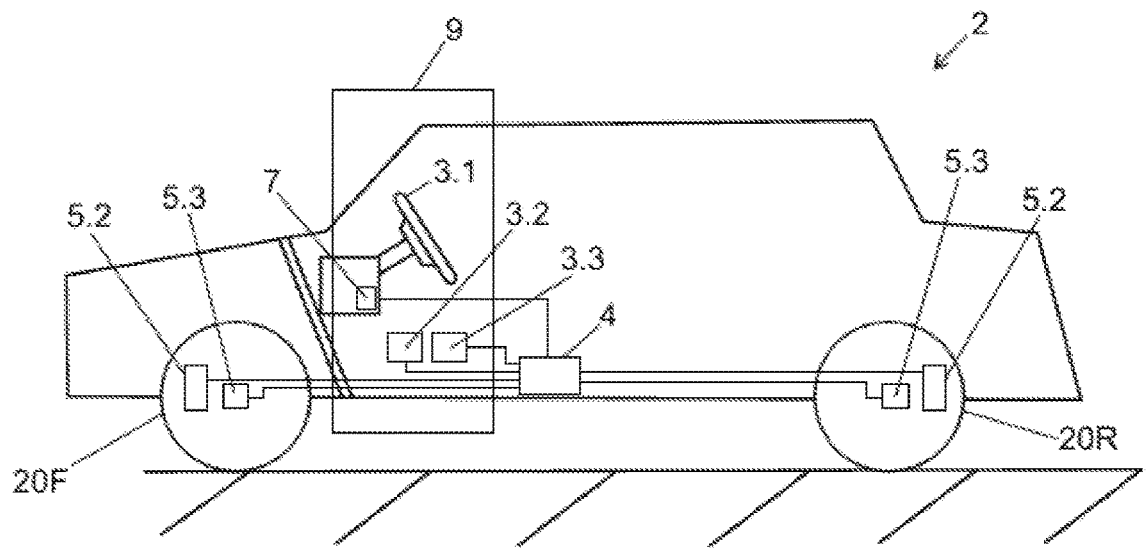
FIG. 2 shows a schematic illustration of another embodiment for operating systems designed according to the disclosure in a motor vehicle.

In the exemplary embodiment shown in FIG. 1, three drive-by-wire systems are schematically shown as operating systems 1 for a motor vehicle, specifically a steer-by-wire steering system 1.1, a brake-by-wire system 1.2, and an electronic power control system 1.3. FIG. 2 shows a schematic illustration of a motor vehicle 2, which includes a steer-by-wire steering system 1.1, a brake-by-wire system 1.2, and an electronic power control system 1.3. In the exemplary embodiment shown in FIG. 2, the steer-by-wire steering system 1.1 only acts on the front wheels 20F of the motor vehicle 2. The brake-by-wire system 1.2 and the electronic power control system 1.3 each act both on the front wheels 20F of the motor vehicle 2 and on the rear wheels 20R of the motor vehicle 2.

The operating systems 1 each comprise in this case a control element 3, which is designed upon actuation to specify a control command M1 for controlling a motor vehicle 2 as control information. Furthermore, the operating systems 1 each comprise a sensor unit 8, which is designed to acquire the control information specified by the control element 3, thus the control command M1 applied to the control element 3. Furthermore, the operating systems 1 comprise a common central control unit 4, in particular an ECU. The control unit 4 is designed to provide a control signal S2 for activating a respective electromechanical actuator unit 5 of the respective operating system 1 based on the acquired control information, which is transmitted as the respective control signal S1 to the control unit 4 from the sensors 8, to implement the respective control command M1. The electromechanical actuator units 5 are each designed here to implement the control command M1 in accordance with the provided control signal S2. Moreover, the operating systems 1 each comprise a feedback actuator 7, which is only shown by way of example for the steer-by-wire steering system 1.1 in FIG. 1 and FIG. 2. The feedback actuator 7 is designed here in each case to apply tactile feedback to the respective control element 3.

The control elements 3, via which a vehicle user can specify a control command M1, on the one hand, and via which a vehicle user can receive feedback FB2 from the respective operating system 1, on the other hand, form a human-machine interface 9 in the present case.

In this exemplary embodiment, the brake-by-wire system 1.2 comprises a brake pedal 3.2 as the control element 3 and a brake actuator unit 5.2 as the electromechanical actuator unit 5. The brake actuator unit 5.2 can in particular comprise at least one brake piston for each wheel 20F, using which brake linings can be moved to or from a brake disc. Due to stepping on the brake pedal 3.2 by a vehicle user, a brake command is specified as the control command M1 here in a known manner, which is acquired by the sensor 8 of the brake-by-wire system 1.2 and is transmitted as the sensor signal S1 to the central control unit 4. Based on the sensor signal S1, the control unit 4 generates a control signal S2, which is transmitted to the brake actuator unit whereupon the brake actuator unit 5.2 implements the control command M1 in accordance with the control signal S2.

The electronic power control system 1.3 shown as a further operating system 1 in FIG. 1 and FIG. 2 comprises in this exemplary embodiment a gas pedal 3.3 as a control element 3 and a drive actuator unit 5.3, in particular wheel hub motors directly driving the wheels of a motor vehicle 2, as the electromechanical actuator unit 5. Due to stepping on the gas pedal 3.3 by a vehicle user, a driving command is specified as the control command M1 here in a known manner, which is acquired by the sensor 8 of the electronic power control system 1.3 and is transmitted as the sensor signal S1 to the central control unit 4. Based on the sensor signal S1, the control unit 4 generates a control signal S2, which is transmitted to the drive actuator unit whereupon the drive actuator unit 5.3 implements the control command M1 in accordance with the control signal S2.

The steer-by-wire steering system 1.1 as a further operating system 1 comprises in this exemplary embodiment a steering column 31 having a steering shaft 32, wherein a steering handle 3.1 designed as a steering wheel is arranged in a rotationally-fixed manner at one end of the steering shaft 32. The steering handle 3.1 is the control element 3 of the steer-by-wire steering system 1.1 here. A vehicle user can specify a steering command as the control command M1 via the steering handle 3.1. The steering handle 3.1 may be rotated here in a known manner to introduce a torque as a control command M1 into the steering shaft 32, which is acquired by the sensor 8 of the steer-by-wire steering system 1.1. In particular, sensor signals S1 with respect to an applied rotational angle, an applied torque, and a rotational velocity of the steering shaft 32 are acquired here by the sensor 8 and transmitted to the control unit 4.

Furthermore, in this exemplary embodiment the steer-by-wire steering system 1 comprises a steering gear having a coupling element 36 designed as a toothed rack and a steering actuator 5.1 as the electromechanical actuator unit 5. The steering actuator 5.1 comprises an electric motor 37 and a steering pinion 35 drivable by means of the electric motor 37 here. The steering pinion 35 may be driven using the electric motor 37 of the steering actuator 5.1 to act on the coupling element 6 and to trigger a steering movement of steerable wheels 20F, which are in particular connected via tie rods 38 to the coupling element 36. The tie rods 38 are themselves each connected in a known manner via steering knuckles to a steered wheel 20F.

In a normal operating mode of the steer-by-wire steering system 1.1, the acquired sensor signals S1 are sent as the acquired control command M1 to the central control unit 4. The control unit 4 generates a control signal in particular based on the received sensor signals S1. The control signal is sent to the electric motor 37 of the steering actuator 5.1 to implement the acquired control command M1 in the steering movement of the steerable wheels 20F. The electric motor 37 thereupon converts the received control signal into a rotational movement of the steering pinion 35 of the steering actuator 5.1, wherein the steering pinion 35 converts this rotational movement into a corresponding translational movement of the coupling element 36, which results in the setting of the steering angle of the steerable wheels 20F. The feedback actuator 7 of the steer-by-wire steering system 1.1 supplies feedback to the steering handle 3.1 here to convey a steering feeling.

All three operating systems 1 share the feature here that they are designed to be operated in such a way that the respective operating system 1 is monitored for an occurrence of a deviation from a target behaviour of the respective actuator unit 5, and tactile feedback FB1 is applied to the respective control element 3 in the event of a detected deviation. The central control unit 4 can in particular comprise a diagnostic unit for detecting a deviation from a target behaviour of the respective actuator unit 5. In particular, however, it can also be provided that the actuator units 5 each comprise a diagnostic unit.

If a deviation from a target behaviour of the respective actuator unit 5 is detected, it is provided in particular that the tactile feedback FB1 applied to the respective control element 3 is a reaction of the respective control element 3 deviating from a normal operation, wherein the tactile feedback FB1 is induced by the feedback actuator 7. A movement pattern, preferably a vibration, can thus in particular be applied to the respective control element 3 as tactile feedback FB1. Alternatively or additionally, however, it is provided in particular for the brake-by-wire system 1.2 that, for example, with brakes responding later, a pedal travel of the brake pedal 5.2 is lengthened. The same can be the case if the drive actuator unit 5.3 of the electronic power control system 1.3 provides a lower power than in normal operation. In the steer-by-wire steering system 1.1 it is provided in particular that a steering resistance torque of the steering shaft 32 is increased when the steering actuator 5.1 operates more sluggishly.

Figure 3:
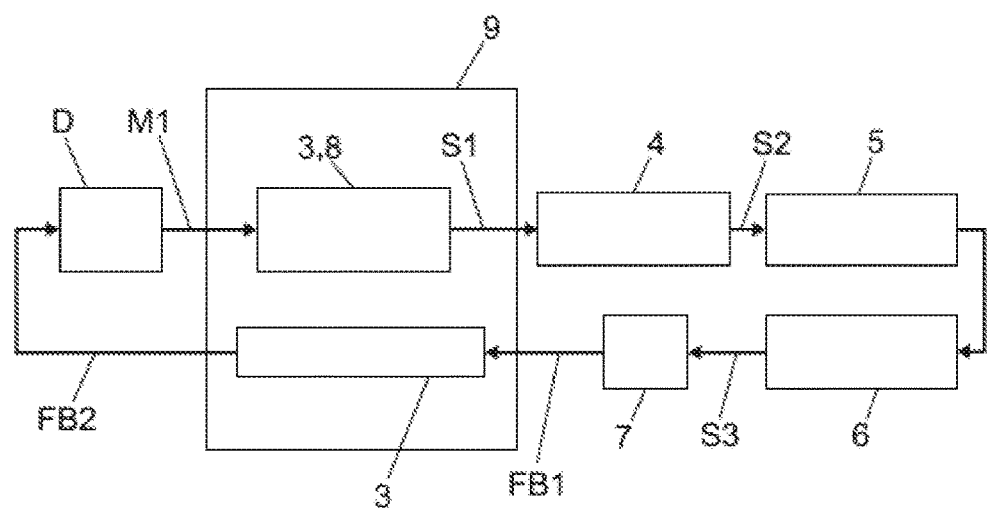
FIG. 3 shows a block diagram to illustrating an embodiment of the sequence of a method designed according to the disclosure.

One advantageous embodiment variant for a method for operating the operating systems 1 shown in FIG. 1 and FIG. 2 will be explained hereinafter with reference to FIG. 3. The method provides that a control command M1 for controlling the motor vehicle 2 is specified by a vehicle user D via a control element 3, which forms a human-machine interface 9. This control command M1 specified via the control element 3 is acquired by at least one sensor 8 and transmitted as a sensor signal S1 to an electronic control unit 4 of the motor vehicle 2. Based on the sensor signal S1 representing the control command M1, a control signal S2 is transmitted from the control unit 4 to the electromechanical actuator unit 5 of the operating system 1. Activated using the control signal S2, the actuator unit 5 implements the control command M1 specified by the vehicle user D accordingly. It is monitored here by means of a diagnostic unit 6 whether the implementation of the control command M1 by the actuator unit 5 corresponds to a predefined target behaviour. In particular, observing predefined threshold values can be evaluated for this purpose. If the implementation of the control command M1 by the actuator unit takes place according to the predefined target behaviour, the operating system 1 is further operated in a known manner. In contrast, if the diagnostic unit 6 detects a deviation from the predefined target behaviour upon the implementation of the control command M1 by the actuator unit 5, a feedback signal S3 is thus generated by the diagnostic unit 6, which is transmitted to the feedback actuator 7 of the operating system 1 to apply tactile feedback FB1 to the control element 3. Based on this feedback signal S3, the feedback actuator 7 generates tactile feedback FB1, which is applied to the control element 3, in particular as a change of a resistance torque during the operation of the control element 3 by the vehicle user D. The tactile feedback FB1 applied to the control element 3 is then perceived as feedback FB2 by the vehicle user D upon use of the control element 3.

In this exemplary embodiment, it is provided here that a quality drop of the actuator unit 5, which can be attributed in particular to wear and/or aging of the actuator unit 5, is monitored by the diagnostic unit 6 as a deviation from the target behaviour. If the quality of the actuator unit 5 thus changes in such a way that a deviation from the target behaviour results therefrom, this is detected and corresponding tactile feedback FB1 is generated. A change of the quality can in particular be a change of the play, a delayed response behaviour, and/or an increase of an internal friction of the actuator unit 5 here. It is also evaluated here by the diagnostic unit 6 how large the deviation from the target behaviour is and a degree of a deviation from the target behaviour is determined and acquired based thereon. The feedback signal S3 for activating the feedback actuator 7 is then generated by the diagnostic unit 6 in dependence on the acquired degree of the target value deviation. This takes place in such a way that a minor deviation established during the operation of the actuator unit 5 from a target behaviour of the actuator unit 5 causes weaker tactile feedback FB1 and a strong deviation from a target behaviour of the actuator unit 5 established during operation of the actuator unit 5 causes strong tactile feedback FB1. The tactile feedback FB1 is thus generated all the more intensely the higher the acquired degree of the deviation from the target behaviour is. The feedback signal S3 can alternately also be generated by the control unit 4, wherein in this case the diagnostic unit 6 transmits the evaluation results to the control unit 4. In particular, the control unit 4 and the diagnostic unit 6 can be formed by a physical computing unit.

The embodiments illustrated in the figures and explained in conjunction therewith are used to explain the disclosure and are not restrictive for it.

LIST OF REFERENCE SIGNS 1 operating system
1.1 steer-by-wire steering system
1.2 brake-by-wire system
1.3 electronic power control system
2 motor vehicle
3 control element
3.1 steering handle
3.2 brake pedal
3.3 gas pedal
4 control unit
5 actuator unit
5.1 steering actuator
5.2 brake actuator unit
5.3 drive actuator unit
6 diagnostic unit
7 feedback actuator
8 sensor unit
9 human-machine interface
20F steerable wheel
20R wheel
31 steering column
32 steering shaft
35 steering pinion of the steering actuator (5.1)
36 coupling element
37 electric motor of the steering actuator (5.1)
38 tie rod
D vehicle user
M1 control command
S1 sensor signal
S2 control signal
S3 feedback signal
FB1 tactile feedback
FB2 feedback perceived by the driver

What is claimed is:

1. A method for operating an operating system of a motor vehicle, comprising:
   specifying a control command (M1) for controlling the motor vehicle via a control element;
   wherein the control command (M1) specified via the control element is sensorially acquired and passed on from an electronic control unit to an electromechanical actuator unit as a control signal (S2);
   wherein the actuator unit implements the control command (M1) according to the control signal (S2);
   wherein the operating system is monitored for an occurrence of a deviation from a target behavior of the actuator unit, and if a deviation is detected, tactile feedback (FB1) is applied to the control element;
   wherein a degree of wear of the actuator unit is monitored by monitoring the deviation from the target behavior.

2. The method of claim 1, wherein if a deviation from the target behavior is detected, a feedback signal (S3) is generated, wherein the tactile feedback (FB1) is generated based on the feedback signal (S3).

3. The method of claim 2, wherein a degree of a deviation from the target behavior is acquired.

4. The method of claim 3, wherein the feedback signal (S3) is generated in dependence on the acquired degree of the target value deviation.

5. The method of claim 4, wherein the tactile feedback (FB1) is generated more intensely the higher the acquired degree of the deviation from the target behavior is.

6. The method of claim 1, wherein the operating system is a brake-by-wire system having a brake pedal as the control element and a brake actuator unit as the electromechanical actuator unit.

7. An operating system for a motor vehicle comprising:
   a control element, configured to specify a control command (M1) for controlling a motor vehicle as control information upon actuation;
   a sensor unit, configured to acquire the control information specified by the control element;
   a control unit, configured to provide a control signal (S2) for activating an electromechanical actuator unit based on the acquired control information to implement the control command (M1),
   an electromechanical actuator unit, configured to implement the control command (M1) according to the provided control signal (S2); and
   a feedback actuator, configured to apply tactile feedback (FB1) to the control element, wherein the operating system is configured to be operated according to the method of claim 1.

8. The operating system of claim 7, wherein the operating system is a drive-by-wire system.

9. The operating system of claim 7, wherein the operating system is a brake-by-wire system having a brake pedal as the control element and a brake actuator unit as the electromechanical actuator unit; or that the operating system is an electronic power control system having a gas pedal as the control element and a drive actuator unit as the electromechanical actuator unit; or that the operating system is a steer-by-wire steering system having a steering handle as the control element and a steering actuator as the electromechanical actuator unit.

10. The method of claim 1, wherein the deviation from the target behavior results from the actuator unit operating more sluggishly as a result of the degree of wear of the actuator unit.

11. The method of claim 1, wherein the deviation from the target behavior results from increased play of the actuator unit as a result of the degree of wear of the actuator unit.

12. The method of claim 1, wherein the deviation from the target behavior results from dropouts occurring in operation of the actuator unit as a result of the degree of wear of the actuator unit.

13. The method of claim 1, wherein the deviation from the target behavior results from a delayed response behavior of the actuator unit as a result of the degree of wear of the actuator unit.

14. The method of claim 1, wherein the deviation from the target behavior results from an increase of an internal friction of the actuator unit as a result of the degree of wear of the actuator unit.

15. The method of claim 1, wherein the operating system is an electronic power control system having a gas pedal as the control element and a drive actuator unit as the electromechanical actuator unit.

16. The method of claim 1, wherein the operating system is a steer-by-wire steering system having a steering handle as the control element and a steering actuator as the electromechanical actuator unit.

17. A method for operating an operating system of a motor vehicle, comprising:
   specifying a control command (M1) for controlling the motor vehicle via a control element;
   wherein the control command (M1) specified via the control element is sensorially acquired and passed on from an electronic control unit to an electromechanical actuator unit as a control signal (S2);

wherein the actuator unit implements the control command (M1) according to the control signal (S2);

wherein the operating system is monitored for an occurrence of a deviation from a target behavior of the actuator unit, and if a deviation is detected, tactile feedback (FB1) is applied to the control element;

wherein a material aging of the actuator unit is monitored by monitoring the deviation from the target behavior.

* * * * *